United States Patent
Bezold et al.

(10) Patent No.: US 11,518,521 B2
(45) Date of Patent: Dec. 6, 2022

(54) SYSTEM AND METHOD FOR DETERMINING THE ORIGIN OF AN OIL LEAKAGE IN AN AIR SUPPLY SYSTEM

(71) Applicant: Airbus Operations GmbH, Hamburg (DE)

(72) Inventors: Andreas Bezold, Hamburg (DE); Elodie Stuber, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 558 days.

(21) Appl. No.: 15/815,876

(22) Filed: Nov. 17, 2017

(65) Prior Publication Data
US 2018/0141665 A1    May 24, 2018

(30) Foreign Application Priority Data
Nov. 21, 2016   (EP) .................... 16199745

(51) Int. Cl.
  *B64D 13/06*   (2006.01)
  *B64D 13/02*   (2006.01)
  (Continued)

(52) U.S. Cl.
  CPC ............ *B64D 13/06* (2013.01); *B64D 13/02* (2013.01); *F02C 6/08* (2013.01);
  (Continued)

(58) Field of Classification Search
  None
  See application file for complete search history.

(56) References Cited

U.S. PATENT DOCUMENTS 5,511,385 A * 4/1996 Drew ................... B64D 13/06
                                                              62/172
6,438,938 B1 * 8/2002 Burkholder ............ F01D 9/065
                                                              184/6.11
(Continued)

FOREIGN PATENT DOCUMENTS

CN       1646366 A       7/2005
EP       2062684         5/2009
(Continued)

OTHER PUBLICATIONS

J. Ramsden; On the proportion of ortho isomers in the tricesyl phosphates contained in jet oil, Journal of Biological Physics and Chemistry, 2013.*

(Continued)

*Primary Examiner* — Todd E Manahan
*Assistant Examiner* — Rodolphe Andre Chabreyrie
(74) *Attorney, Agent, or Firm* — Greer, Burn & Crain, Ltd.

(57) ABSTRACT

An air supply system comprising at least two bleed sources configured to provide bleed air, wherein each bleed source comprises an engine or an auxiliary power unit and an oil as lubricant for the engine or the auxiliary power unit. The system also includes at least one air conditioning pack for cooling the bleed air from the bleed sources, and a plurality of bleed ducts, wherein each bleed duct connects one of the bleed sources to the at least one air conditioning pack. The system further comprises a plurality of detectors, wherein each detector is associated with a bleed source and the plurality of detectors are configured for detecting substances specific for the oil.

13 Claims, 3 Drawing Sheets

(51) Int. Cl.
  *F02C 6/08* (2006.01)
  *F24F 11/00* (2018.01)

(52) U.S. Cl.
  CPC ............... *B64D 2013/0603* (2013.01); *B64D 2013/0688* (2013.01); *F24F 2011/0002* (2013.01); *Y02T 50/50* (2013.01)

(56) References Cited

U.S. PATENT DOCUMENTS

| | | | |
|---|---|---|---|
| 6,737,988 B2 | 5/2004 | Horner et al. | |
| 9,020,764 B2* | 4/2015 | Walte | B64D 45/0061 702/24 |
| 2006/0054025 A1 | 3/2006 | Kang et al. | |
| 2008/0202332 A1 | 8/2008 | Rowley et al. | |
| 2010/0011923 A1 | 1/2010 | Suda et al. | |
| 2011/0192170 A1* | 8/2011 | Dooley | F02C 6/08 60/785 |
| 2015/0047684 A1* | 2/2015 | Mitchell | H01L 35/28 136/201 |
| 2015/0375187 A1 | 12/2015 | Yates et al. | |
| 2016/0083667 A1* | 3/2016 | Scherer | C10M 129/72 508/459 |
| 2016/0214723 A1* | 7/2016 | Fox | B64D 13/06 |
| 2016/0214724 A1* | 7/2016 | Fox | B64D 13/06 |

FOREIGN PATENT DOCUMENTS

| | | |
|---|---|---|
| WO | 2016189420 | 12/2016 |
| WO | 2016189421 | 12/2016 |

OTHER PUBLICATIONS

J. Roth, Bleed air oil contamination particulate Characterization, Thesis of Master of Science, Kansas State University, 2015.*
Formation of potentially toxic carbonyls during oxidation of triolein in the presence of alimentary antioxidants; Marini Damanik, Michael Murkovic; Monatsh Chem (2017) 148:2031-2035; Oct. 19, 2017.*
European Search Report, dated Apr. 10, 2017, priority document.
Chinese Examination Report for Corresponding Chinese Patent Application No. 201711135139.7 dated Jul. 21, 2020, 9 pages.
J. Ramsden, "On the Proportion of Ortho Isomers in the Tricesyl Phosphates Contained in Jet Oil" Journal of Biological Physics and Chemistry.

* cited by examiner

SYSTEM AND METHOD FOR DETERMINING THE ORIGIN OF AN OIL LEAKAGE IN AN AIR SUPPLY SYSTEM

CROSS-REFERENCES TO RELATED APPLICATIONS

This application claims the benefit of the European patent application No. 16 199 745.7 filed on Nov. 21, 2016, the entire disclosures of which are incorporated herein by way of reference.

BACKGROUND OF THE INVENTION

The invention relates to an air supply system and a method for detecting oil leakage from bleed sources. The air supply system and method can be used in aircraft to specifically detect an oil leakage and determine the origin of the oil leakage.

Air supply systems can also be regarded as environmental control systems (ECS) that comprise an equipment in charge of maintaining a comfortable close environment in the aircraft cabin, i.e., by keeping the temperature, pressure and composition (including humidity) of the environmental air in the cabin within acceptable limits The Environmental Control System thus has to provide an artificial climate in the aircraft cabin. Air from the outside has to be pressurized and temperature controlled.

During flight, outside air is taken from the compressor stage of the engines ("bleed air") passing a pre-cooler unit and entering the "air conditioning pack" with a temperature of approximately 200° C.

The air conditioning pack cools the air to the required temperature using outside air ("ram air") as the cooling medium and air cycle machines for compression cooling.

A mixer unit, installed below the cabin floor in front of the center wing box, mixes outside air with cabin air. The cabin air, which has entered the underfloor area, is drawn through recirculation filters by recirculation fans. The recirculation fans blow the air through check valves to the mixer unit. The quantity of recirculated cabin air mixed with outside air varies from 40% to 60% in normal operating conditions.

On occasion, carbon seals can leak small amounts of oil normally used for the bearings of the engines into the compressor stage of the engine and hence also into the bleed air.

Due to the complexity of the overall air supply system and the mixing of air coming from different compressed air sources in the system, in case of a contamination in the bleed/compressed air system, it is extremely difficult to identify the origin of the contamination.

SUMMARY OF THE INVENTION

Several investigations were performed on pyrolysis of synthetic oils used for lubrication in bearings of aircraft engines and auxiliary power units. Often additives like Tricresylphosphates are the main subject of these investigations, as those are often claimed to be neurotoxic. It is, however, known that the aforementioned lubricants in most cases consist of synthetic esters. It is also known that, in general, organic acids can be released from native fatty acid esters (vegetable oils) due to oxidative reaction or hydrolysis. The content of acids is often used as a quality benchmark of native oils (acidity of oils and fats). In the framework of experiments that have led to this invention, it has been considered feasible, that similarly to vegetable oils, respective acids may be released, in particular, during thermal stress from synthetic ester based engine oils as well.

The detection of specific acids released from oil used as lubricant has not yet been described in the literature as method to detect oil leakages into the air used for pressurization and ventilation of aircraft.

The present invention is directed to an object of providing a system and a method for detecting oil leakage from bleed sources and thus for detecting oil contamination in compressed air of aircraft. The system and method further allow the precise determination of the origin of an oil leakage, such that the oil leakage can be easily dealt with.

An air supply system comprises at least two bleed sources configured to provide bleed air, wherein each bleed source comprises an engine or an auxiliary power unit and an oil as lubricant for the engine or the auxiliary power unit; at least one air conditioning pack for cooling the bleed air from the bleed sources; and a plurality of bleed ducts, wherein each bleed duct connects one of the bleed sources to the at least one air conditioning pack, characterized in that the system further comprises a plurality of detectors, wherein each detector is associated with a bleed source and the plurality of detectors are configured for detecting substances specific for the oil.

Each of the plurality of detectors preferably is an ion mobility spectrometer, a miniaturized mass spectrometer or a laser based infrared spectrometer (e.g., using quantum cascade lasers—QCLs).

The substances specific to current jet engine oils to be detected are most preferably substances used in the formation of the ester base stock like pentanoic acid and heptanoic acid as qualifiers. Oil unspecific substances, such as formaldehyde, acetaldehyde, formic acid and acetic acid are complementary indicators, which can be used as quantifiers.

At least one of the plurality of detectors can be connected to each of the plurality of bleed ducts connecting the bleed sources to the at least one air conditioning pack, and/or at least one of the plurality of detectors can be connected to the at least one air conditioning pack.

The air supply system can further comprise a mixer unit connected to the at least one air conditioning pack, and a plurality of mixer ducts connecting the mixer unit to the at least one air conditioning pack, wherein the mixer unit mixes cooled bleed air from the at least one air conditioning pack with air from a cabin and/or cockpit, and at least one of the plurality of detectors is connected to each of the plurality of mixer ducts connecting the mixer unit to the at least one air conditioning pack.

The air supply system can further comprise three bleed sources comprising two engines and an auxiliary power unit, or five bleed sources comprising four engines and an auxiliary power unit ; a synthetic oil as lubricant for the engines and the auxiliary power unit; at least one air conditioning pack for cooling the bleed air from the bleed sources; a plurality of bleed ducts connecting the three or five bleed sources to the at least one air conditioning pack, a mixer unit connected to the at least one air conditioning pack, a plurality of mixer ducts connecting the mixer unit to the at least one air conditioning pack, and a plurality of detectors, wherein at least one of the plurality of detectors is connected to each of the plurality of bleed ducts, the plurality of mixer ducts, and/or the at least one air conditioning pack.

A method for detecting oil leakage from bleed sources comprises the steps of: providing bleed air through at least two bleed sources, wherein each bleed source comprises an engine or an auxiliary power unit and an oil as lubricant for the engine or the auxiliary power unit, feeding the bleed air from the at least two bleed sources to at least one air conditioning pack through a plurality of bleed ducts, cooling the bleed air from the at least two bleed sources with at least one air conditioning pack, characterized in that the system further comprises detecting substances specific for the oil with a plurality of detectors, wherein each detector is associated with a bleed source, wherein each of the plurality of detectors is configured for detecting at least one substance specific for the oil, and determining from which of the bleed sources an oil has leaked.

Each of the plurality of detectors preferably is an ion mobility spectrometer, a miniaturized mass spectrometer, or a laser based infrared spectrometer (e.g., using QCLs).

The substance specific for the oil, preferably, is a substance containing a carbonyl group, or a substance containing a carboxyl group. More preferably, the substance specific for the oil is a saturated or unsaturated, linear or branched carboxylic acid with a carbon number from 1 to 10; or a saturated or unsaturated, linear or branched aldehyde with a carbon number from 1 to 10. In a particularly preferred embodiment, the substances specific for the oil to be detected are most preferably used in the formation of the ester base stock like pentanoic acid, heptanoic acid or other precursors. Oil unspecific substances such as formaldehyde, acetaldehyde, formic acid and acetic acid are complementary indicators.

At least one of the plurality of detectors can be connected to each of the plurality of bleed ducts connecting the bleed sources to the at least one air conditioning pack, and/or at least one of the plurality of detectors can be connected to the at least one air conditioning pack.

The method can further comprise the steps of: detecting substances specific for the oil, wherein at least one of the plurality of detectors is connected to each of the plurality of bleed ducts connecting the bleed sources to the at least one air conditioning pack, and/or detecting substances specific for the oil, wherein at least one of the plurality of detectors is connected to the at least one air conditioning pack.

The method can further comprise the steps of: mixing cooled bleed air from the at least one air conditioning pack with air from a cabin and/or cockpit in a mixer unit, and detecting substances specific for the oil, wherein at least one of the plurality of detectors is connected to each of the plurality of mixer ducts connecting the mixer unit to the at least one air conditioning pack.

BRIEF DESCRIPTION OF THE DRAWINGS

Preferred embodiments of the invention are explained in the following with reference to the schematic drawings, of which

DETAILED DESCRIPTION OF THE PREFERRED EMBODIMENTS

Air Supply System

Figure 1:
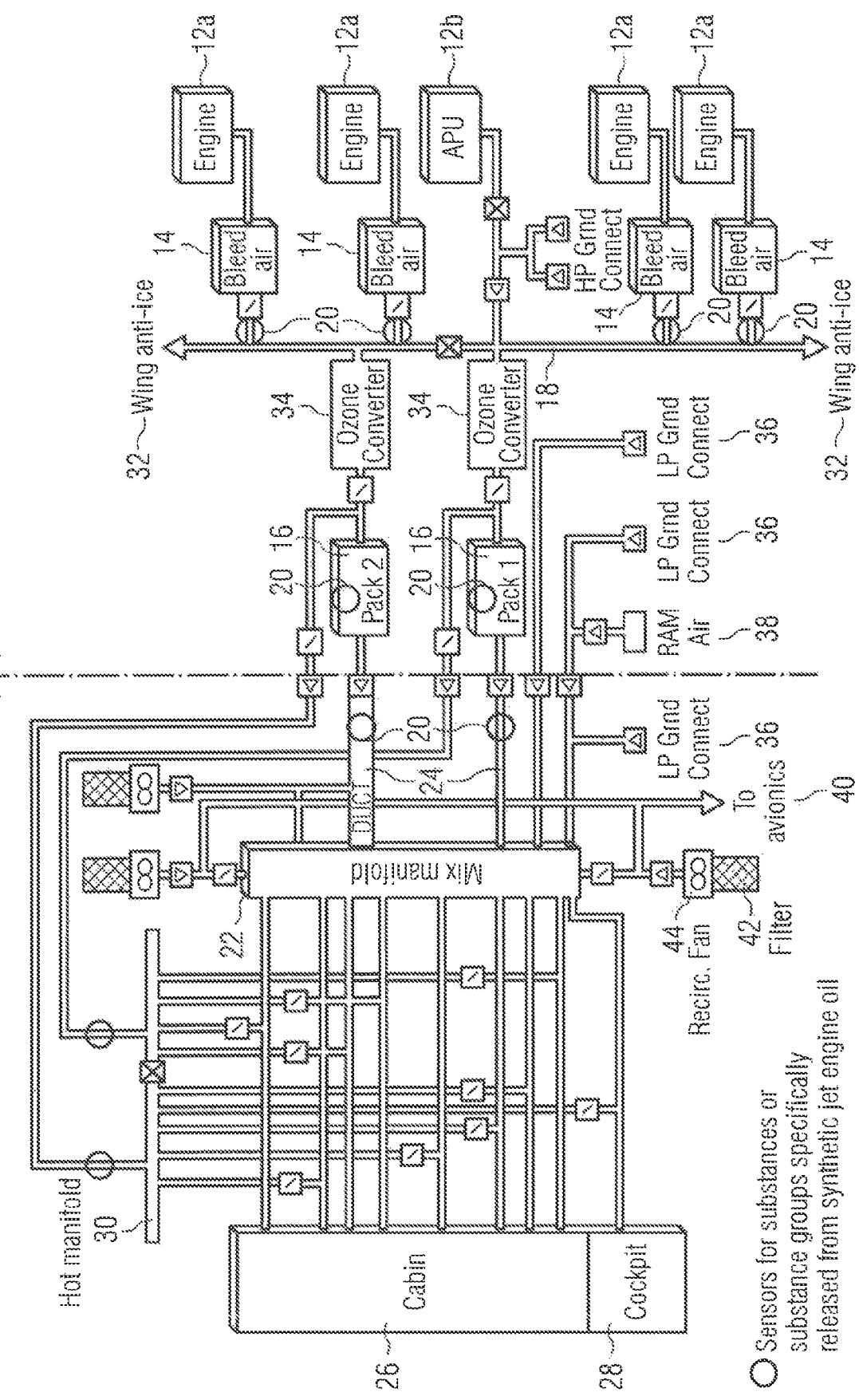
FIG. 1 shows an example of an air supply system for an aircraft.

An air supply system 10 shown in FIG. 1 comprises at least two bleed sources 12 configured to provide bleed air 14, wherein each bleed source comprises an engine 12a or an auxiliary power unit 12b and an oil as lubricant for the engine or the auxiliary power unit; at least one air conditioning pack 16 for cooling the bleed air from the bleed sources; and a plurality of bleed ducts 18, wherein each bleed duct connects one of the bleed sources to the at least one air conditioning pack, characterized in that the system further comprises a plurality of detectors 20, wherein each detector is associated with a bleed source and the plurality of detectors are configured for detecting substances specific for the oil.

An air supply system is a system that can provide a comfortable environment to the cabin and cockpit of an aircraft. The air supply system can also be regarded as an environmental control system of which specific parts and components are described in further detail in the following. Even though air supply systems or environmental control systems are complex systems comprising many interrelated components, the main components required for carrying out the present invention are those described above and in the claims. The skilled person is able to identify further components that can be added to the air supply system without impeding the nature of the invention.

Environmental Control System ECS

The environmental control system ECS is an equipment in charge of maintaining a comfortable close environment in the aircraft cabin, i.e., by keeping the temperature, pressure and composition including room humidity of the environmental air in the cabin within acceptable limits.

The Environmental Control System thus has to provide an artificial climate in the aircraft cabin. Air from the outside has to be pressurized and temperature controlled.

During flight, outside air is taken from the compressor stage of the engines "bleed air" passing a pre-cooler unit and entering the "air conditioning pack" with a temperature of approximately 200° C. The outside air can also be compressed via electrical compressors. The air conditioning packs can also be supplied via the Auxiliary Power Unit a turbine driven air compressor and electrical generator or a ground based source via the high-pressure ground connector.

The air conditioning pack cools the air to the required temperature using outside air "ram air" as the cooling medium and air cycle machines for compression cooling. In principle, this represents a two-stage compression process with subsequent cooling after each compression and finally the expansion cooling of the supplied outside air which enters the pressurized fuselage passing a check valve in the pressure bulkhead.

A mixer unit, installed below the cabin floor in front of the center wing box, mixes outside air with cabin air. The cabin air, which has entered the underfloor area, is drawn through recirculation filters by recirculation fans. The recirculation fans blow the air through check valves to the mixer unit. The quantity of recirculated cabin air mixed with outside air varies from 40% to 60% in normal operating.

Due to the complexity of the overall air supply system and the mixing of air coming from different compressed air sources in the system, in case of a contamination in the bleed/compressed air system it is extremely difficult to identify the origin of the contamination, by selecting different system configurations. Detectors positioned in a direct connection with singular bleed sources can be very useful to narrow down the potential origin of the contamination. This can also be the case if this connection is only temporarily dedicated to a singular bleed source depending on the operation the same duct can be used by different sources and partially in different flow directions e.g., during engine start.

During flight tests with an artificial contaminated engine, it was observed that the first occurrence of generated odor mainly caused by organic acids released was accompanied by a steep increase of fine particulate matter, i.e., <1 μm in diameter. The second occurrence of odor did not show this behavior and is attributed to the system complexity where odorous substances, mainly organic acids, can be adsorbed or condensed and later on—due to an increase of temperature—can be released and consequently provoke odor in the cabin. However, this second odor occurrence does not have a temporal relation to the actual contamination event and could hardly be attributed to a specific origin once the origin is not known. Therefore, it is considered sensible to measure the indicative substances for an oil contamination directly in the bleed air duct or any duct with direct connection and clearly relatable to any given bleed air source with a minimum of temperature and pressure changes, which can be necessary to adapt these parameters to the operating range of the respective sensor.

Detection of substances specific to thermally degraded engine oil like pentanoic acid or heptanoic acid in the bleed air system can help to quickly identify the source of contamination and initiate respective countermeasures in case of an obvious event, but also can serve as monitoring method for proactive maintenance.

The engines of an aircraft, in addition to providing thrust, have to deliver electrical, pneumatic and hydraulic secondary power to the systems in the aircraft. Among these systems, the ECS is the main power consumer which can, for example, be about 75% of non-propulsive power energy, which can be about 1% of the propulsion energy and it generates the most important extra consumption of fuel.

With engines off on the ground, the auxiliary power unit APU, as described above, provides electrical power and bleed air for air conditioning and the start of the main-engines.

The pneumatic system of an aircraft can include bleed air at 250 kPa and 450 K for the internal ECS, i.e., cabin air.

The cabin air conditioning must provide comfort conditions, which can be set at 22±2° C., 90-100 kPa and 50-70% RH under all foreseeable circumstances, such as outer temperatures ranging from −60 to +50° C., outer pressures of 10 to 110 kPa, 0-100% RH, ozone, etc. The ECS must therefore provide ventilation, pressurization, heating, cooling, humidification, dehumidification demisting of windows and disinfection.

In a typical setup of an ECS, air is bled from the main engine compressors through a flow control valve at around 250 kPa. The compressed air is very hot, e.g., >200° C., because of the adiabatic compression-heating.

As pressure and temperature of this bleed air varies according to which compressor stage is used and the power setting of the engine, the pressure is regulated by having two or three bleedings at different stages and control valves. A manifold pressure regulating shut-off valve MPRSOV restricts the flow as necessary to maintain the desired pressure for downstream systems. A certain minimum supply pressure is needed to drive the air through the system, but it can be desired to use as low a supply pressure as possible, because the energy the engine uses to compress the bleed air is not available for propulsion, and fuel consumption suffers. For this reason, air is commonly drawn from one of two bleed ports at different compressor stage locations. When the engine is at low pressure low thrust or high altitude, the air is drawn from the highest-pressure bleed port. As pressure is increased and reaches a predetermined crossover point, the high pressure shut-off valve HPSOV closes and air is selected from a lower pressure port to minimize the fuel performance loss. The reverse happens as engine pressure decreases.

The hot bled air requires cooling before entering the cabin. A simple heat exchanger HE with outside air might not be efficient for this task.

To guarantee that bled air can be safely piped from the engine through the fuselage to the air-cycle machine and deicing system, a heat-exchanger pre-cooler in the engine can cool bled air from the compressor at >200° C. to about 200° C. Pre-cooled air from the bleed system can be further cooled in a primary heat exchanger down to about 110° C., and then enters a compressor that raises the air to about 210° C., and a second heat exchanger lowers the temperature again to about 100° C.

Afterwards, air can pass through a turbine and exit at about 5° C., to be mixed with some hotter bled air at around 100-200° C. to get the 10 to 35° C. needed to keep the cabin air at around 22° C., accounting for internal heat release from passengers and equipment, outside heat gain and loses, and air recirculation.

Additional filters/separators can be provided to remove water condensate on ground and low altitudes in humid climates. The filters/separators are arranged just downstream the air cycle machine ACM turbine in most cases, and upstream the turbine, when very cold cabin air is needed on ground, to avoid the risk of icing inside the turbine. The condensate is injected into the ram air stream to help HE efficiency. Additionally, high efficiency particulate arresting HEPA filters can be used, which trap more than 99% of all bacteria and clustered viruses.

Ram air can be used as a heat sink in both heat exchangers. Ram air can be captured through an inlet door and a diffuser, and forced by a fan driven by the ACM turbine to go through the two heat exchangers mentioned above, an exhaust nozzle, and a louvered exit door.

The resulting air can be directed to overhead distribution nozzles in the various "zones" of the aircraft. Temperature in each zone can be adjusted by adding small amounts of "trim air," which is high-pressure, high-temperature air tapped off an A/C pack downstream of the FCV and upstream of the pack. Air is also supplied to individual gaspers: small, circular vents above each passenger seat that can be adjusted by passengers for their personal comfort. A revolving control on the vent can be turned to adjust ventilation between no air output at all and a fairly substantial breeze.

Two equal air cycle machine nominal systems can be implemented, to allow for a failure of one of the air cycle machine systems.

Bleed Source and Bleed Air

A bleed source is a source that can provide compressed air into an air supply system. The compressed air is also referred to as bleed air in the technical field of the present invention. Common bleed sources in aircrafts are engines and auxiliary power units, but also other kinds of air compressors.

Bleed air produced by gas turbine engines is compressed air that is taken from the compressor stage of those engines, which is upstream of the fuel-burning sections. In modern airliner engines, two regulator valves, high stage and low stage, turn on and off automatically and are controlled by at least two air supply and cabin pressure controllers ASCPCs which open and close appropriate valves. Engine Bleed Air comes from the high stage or low stage engine compressor section. Low stage air is used during high power setting operation and high stage air is used during descent and other low power setting operations. Bleed air from that system can be used for internal cooling of the engine, cross-starting another engine, engine and airframe anti-icing, cabin pressurization, pneumatic actuators, air-driven motors, pressurizing the hydraulic reservoir, waste and water storage tanks. Some engine maintenance manuals refer to such systems as "Customer Bleed Air." Bleed air is valuable in an aircraft for two properties: high temperature and high pressure. Typical values are 200-250° C. and 275 kPa, for regulated bleed air exiting the engine pylon for use throughout the aircraft.

An auxiliary power unit APU is a device on a vehicle such as an aircraft that provides energy for functions other than propulsion. The primary purpose of an aircraft APU is to provide power to start the main engines. Turbine engines must be accelerated at a high rotational speed to provide sufficient air compression for self-sustaining operation. However, APUs are also used to run accessories while the engines are shut down. This allows the cabin to be comfortable while the passengers are boarding, before the aircraft's engines are started. APUs also are a critical safety device, as they supply backup electricity and compressed air in place of a dead engine of failed main engine generator. APUs are also used in environmental control systems ECS of aircraft and support the provision of an artificial climate in the aircraft cabin.

Oil Used as Lubricant for the Engine or the Auxiliary Power Unit

The oil used as lubricant for the engine or the auxiliary power unit is also called engine oil, or engine lubricant, and is a substance that can be oil enhanced with additives that are used for lubrication of internal combustion engines. Motor oils are derived from petroleum-based and non-petroleum-synthesized chemical compounds.

Synthetic lubricant oils are preferably used herein.

Motor oils can be blended by using base oils composed of hydrocarbons, polyalphaolefins PAO, and polyinternal olefins PIO, i.e., organic compounds consisting entirely of carbon and hydrogen.

Engine oil or engine lubricant is used for the lubrication, cooling, and cleaning of internal combustion engines. Lubricant base stocks are categorized into five groups by the American Petroleum Institute API. It is noted that there are also ways of categorizing lubricants, to which this application does not make reference. Group I base stocks are composed of fractionally distilled petroleum which is further refined with solvent extraction processes to improve certain properties such as oxidation resistance and to remove wax. Group II base stocks are composed of fractionally distilled petroleum that has been hydrocracked to further refine and purify it. Group III base stocks have similar characteristics to Group II base stocks, except that Group III base stocks have higher viscosity indexes. Group III base stocks are produced by further hydrocracking of either Group II base stocks or hydroisomerized slack wax a Group I and II dewaxing process by-product. Group IV base stock are polyalphaolefins PAOs. Group V is a catch-all group for any base stock not described by Groups I to IV. Examples of group V base stocks include polyesters POE, polyalkylene glycols PAG, and perfluoropolyalkylethers PFPAEs. Groups I and II are commonly referred to as mineral oils, group III is typically referred to as synthetic and group IV is a synthetic oil. Group V base oils are so diverse that there is no catch-all description.

Oils that are used as lubricants comprise hydrocarbons. Due to thermal degradation of the oil, substances such as carboxylic acids and aldehydes are released. Some of those are rather non-specific and could be released from other thermally degraded hydrocarbons as well. The specific substances to be detected are most preferably the precursors used in the production of the base stock of the oil like pentanoic acid and heptanoic acid or alternative precursors. Oil unspecific substances such as formaldehyde, acetaldehyde, formic acid and acetic acid are complementary indicators of an oil leakage.

Specific oils or which above mentioned markers have determined to be adequate are mobile jet oil II and BP Turbo oil.

Additives in Engine Oil or Engine Lubricant

In addition to viscosity index improvers, engine oil or engine lubricant can include other additives such as detergents and dispersants to help keep the engine clean by minimizing sludge buildup, corrosion inhibitors, and alkaline additives to neutralize acidic oxidation products of the oil.

Additives can be extreme-pressure EP additives such as aliphatic chlorinated hydrocarbons chlorinated paraffins, e.g., chloroalkanes, trichloromethyl phosphine acids, organic esters of a-acetoxy-b,b,b-trichloroethyl phosphonic acid, trichloromethyl esters of phosphoric acid, trichloromethyl derivates of sulfur, trichloroacetoxy compounds, esters or amine salts of chlorendic acid, 1,2,3,4,7,7-hexachloro-5-dimethylbicyclo [2.2.1]-2-heptene. EP additives, like zinc dialkyldithiophosphate ZDDP additives and sulfonates, preferably calcium sulfonates, are used for additional protection under extreme-pressure conditions or in heavy duty performance situations. ZDDP starts decomposing at 130-170° C., while the activation temperature of 1,2,3-Trichloropropane TCP typically exceeds 200° C. Their reaction products form a chemically bonded lubricating film on the surfaces. Calcium sulfonates additives are also added to protect engine oil or engine lubricant from oxidative breakdown and to prevent the formation of sludge and varnish deposits.

Some molybdenum disulfide containing additives to lubricating oils can reduce friction, bond to metal, or have anti-wear properties. MoS2 particles can be shear-welded on steel surfaces and some engine components are treated with MoS2 layer during manufacture, namely liners in engines. Molybdenum compounds decompose under high pressure to form an in-situ deposited layer of molybdenum disulfide. Molybdenum dithiocarbamates are used as additives for greases.

Sulfur-containing extreme pressure additives do not cause corrosion problems in gears with parts made of bronze, brass and other copper alloys when high temperature environments are encountered, if they have the presence of lubrification oil.

Other additives are oil-soluble organophosphates, with or without zinc, that have excellent high-pressure and antiwear properties, and provide corrosion protection especially in presence of chlorinated hydrocarbons.

Also, additives such as polysulfides can be used, which serve as carriers of inactive and active sulfur.

Additives can also be antiwear additives which are additives for lubricants to prevent metal-to-metal contact between parts of gears. Antiwear additives can be zinc dithiophosphate ZDP, tricresyl phosphate TCP for high-temperature operation in turbine engine lubricants, halocarbons chlorinated paraffins for extreme pressure operations, glycerol mono oleate, stearic acid adhering to surfaces via reversible adsorption process under 150° C. Under extreme pressure conditions, the performance of AW additives becomes insufficient and designated EP additives are required.

From the above, zinc dialkyl dithio phosphate ZDDP is the preferred additive, as it acts as antiwear additive, as a corrosion inhibitor and antioxidant.

Detectors Used for Detection of Substances Specific for Oil

The preferred detectors used for the detection of substances specific for oil are ion-mobility spectrometers IMS, miniature mass spectrometer MMS or laser based infrared spectrometers. Ion-mobility spectrometry is an analytical technique used to separate and identify ionized molecules in the gas phase based on their mobility in a carrier buffer gas. IMS devices can be tailored for a specific application and can be miniaturized to small sizes. Systems operated at higher pressure i.e., atmospheric conditions, 1 atm or 1013 mbar are also accompanied by elevated temperature above 100° C., while lower pressure systems 1-20 mbar do not require heating. The detection limit is below ppb parts per billion, the speed at which separations occur in an IMS are typically on the order of tens of milliseconds and a wide variety of substance classes can be detected by an IMS.

In a schematic explanation of an IMS, produced ions travel through a drift tube which has an applied electric field and a carrier buffer gas that opposes the ion motion. At the end of the tube is a detector. Based on an ion's mass, charge, size and shape the ion mobility, the migration time through the tube is characteristic of different ions, leading to the ability to distinguish different analyte species. In this respect, the ions are, on the one hand, accelerated by the applied electrical field and, on the other hand, are slowed down by collision with the carrier buffer gas. The resulting speed at which the ions strike a detector is characteristic for the specific ion.

The area of an ion that gas molecules strike is an ion's collision cross-section, related to the ion size and shape. The greater this collision cross-section is, meaning the larger the ion size, the more area available for buffer gas to collide and impede the ion's drift—the ion then requires a longer time to migrate through the drift tube.

IMS devices comprise an ionizer, usually a corona discharge, atmospheric pressure photoionization APPI, electrospray ionization ESI, or radioactive source. ESI and MALDI techniques can also be used when IMS is paired with mass spectrometry.

The analyzer can be a TOFIMS, which measures how fast a given ion moves in a uniform electric field through a given atmosphere. In specified intervals, a sample of the ions is let into the drift chamber. Once in the drift tube, ions are subjected to a homogeneous electric field ranging from a few volts per centimeter up to many hundreds of volts per centimeter. This electric field then drives the ions through the drift tube where they interact with the neutral drift molecules contained within the system. In the drift tube, chemical species separate based on the ion mobility, arriving at the detector for measurement. Ions are recorded at the detector in order from the fastest to the slowest, generating a response signal characteristic for the chemical composition of the measured sample. Other analyzers that can be employed are DMS/FAIMS differential mobility spectrometer/High-field asymmetric waveform ion mobility spectrometry and DMAs differential mobility analyzer.

The drift gas pressure is an important parameter for the IMS instrument design and resolution. Most drift gases have a higher break down voltage at pressures higher than a few mbar, with the break down voltage increasing as the pressure increases. As an example, high drift voltages of about 10-30 kV can be used with tubes of 1 m length and high gas pressures of 100-1000 mbar to obtain high resolutions. At pressures higher than 10 mbar, ions become more difficult to store. At lower pressures, ions can be stored more easily to obtain an accumulated continuous signal, with the trade-off of lower electric fields around 10-30 V/cm. Elevated gas temperature assists in removing ion clusters that can distort experimental measurements.

The detector can be a simple Faraday plate, or a mass spectrometers can be coupled to the IMS, such that both size and mass information can be obtained simultaneously.

A miniature mass spectrometer MMS is a type of mass spectrometer, which has a small size and weight and is usually understood as a portable or handheld device. Such devices are known in the art and can be used according to the skilled persons knowledge.

Preferred Embodiments of the Air Supply System

The substance specific for the oil preferably is a substance containing a carbonyl group, or a substance containing a carboxyl group. More preferably, the substance specific for the oil is a saturated or unsaturated, linear or branched carboxylic acid with a carbon number from 1 to 10; or a saturated or unsaturated, linear or branched aldehyde with a carbon number from 1 to 10. In a particularly preferred embodiment, the substances specifically to be detected are most preferably substances used as precursors for the base stock of the oil like pentanoic acid and heptanoic acid. Oil unspecific substances such as formaldehyde, acetaldehyde, formic acid and acetic acid are complementary indicators of an oil leakage.

At least one of the plurality of detectors 20 can be connected to each of the plurality of bleed ducts 18 connecting the bleed sources 12 to the at least one air conditioning pack 16, and/or at least one of the plurality of detectors 20 can be connected to the at least one air conditioning pack 16.

Accordingly, at least one detector 20 is located directly downstream of each of the bleed sources. Each bleed source has thus at least one detector associated to the bleed source. Each of the detectors allows for the measurement of an oil leakage immediately downstream of the bleed sources. Each detector allows the detection of an oil leakage at an individual of the bleed sources.

The detectors can preferably be located between the bleed source and the at least one air conditioning pack 16. The detectors can also be located at the at least one air conditioning pack 16. The detectors can also be located between the at least one air conditioning pack 16 and the mix manifold 22. The detectors can also be located between the bleed source and the hot manifold 30

The detectors are preferably connected to the bleed duct 18 connecting the bleed source 12 and the at least one air conditioning pack 16. The detectors can also be connected directly to the at least one air conditioning pack 16. The detectors can also be connected to the mixer duct connecting the at least one air conditioning pack 16 to the mix manifold 22 or mixer unit 22. The detectors can also be connected to the duct between the bleed source 12 and the hot manifold 30. Detectors can be also connected downstream the high-pressure ground connector to cover hot air supply by a ground supply unit.

In case the pressure and/or temperature of the bleed air is too high, the bleed air can be at least partially cooled and/or depressurized before it is fed to the detector 20.

The air supply system 10 can further comprise a mixer unit 22 or mix manifold 22 connected to the at least one air conditioning pack, and a plurality of mixer ducts 24 connecting the mixer unit to the at least one air conditioning pack, wherein the mixer unit 22 mixes cooled bleed air from the at least one air conditioning pack 24 with air from a cabin 26 and/or cockpit 28, and at least one of the plurality of detectors 20 is connected to each of the plurality of mixer ducts 24 connecting the mixer unit 22 to the at least one air conditioning pack 16.

The air supply system 10 can further comprise three bleed sources 12 comprising two engines 12a and an auxiliary power unit 12b, or five bleed sources 12 comprising four engines 12a and an auxiliary power unit 12b; a synthetic oil as lubricant for the engines and the auxiliary power unit; at least one air conditioning pack 16 for cooling the bleed air from the bleed sources; a plurality of bleed ducts 18 connecting the three or five bleed sources 12 to the at least one air conditioning pack 16, a mixer unit 22 connected to the at least one air conditioning pack 16, a plurality of mixer ducts 24 connecting the mixer unit 22 to the at least one air conditioning pack 16, and a plurality of detectors 20, wherein at least one of the plurality of detectors is connected to each of the plurality of bleed ducts 18, the plurality of mixer ducts 24, and/or the at least one air conditioning pack 16.

The air supply system can further comprise a hot manifold 30, a wing anti-ice system 32, an ozone converter 34 for converting ozone into oxygen, ground connectors 36, a feed for ram air 38, an avionic system 40, a filter 42 and a recirculation fan 44.

Method for Detecting Oil Leakage from Bleed Sources

A method for detecting oil leakage from bleed sources comprises the steps of: providing bleed air through at least two bleed sources, wherein each bleed source comprises an engine or an auxiliary power unit and an oil as lubricant for the engine or the auxiliary power unit, feeding the bleed air from the at least two bleed sources to at least one air conditioning pack through a plurality of bleed ducts, cooling the bleed air from the at least two bleed sources with at least one air conditioning pack, characterized in that the system further comprises detecting a substance specific for the oil with a plurality of detectors, wherein each detector is associated with a bleed source, wherein each of the plurality of detectors is configured for detecting one or several substances specific for the oil, and determining from which of the bleed sources an oil has leaked.

Each of the plurality of detectors 20, preferably, is an ion mobility spectrometer or a miniaturized mass spectrometer.

The substance specific for the oil preferably is a substance containing a carbonyl group, or a substance containing a carboxyl group. More preferably, the substance specific for the oil is a saturated or unsaturated, linear or branched carboxylic acid with a carbon number from 1 to 10; or a saturated or unsaturated, linear or branched aldehyde with a carbon number from 1 to 10. In a particularly preferred embodiment, the substances specific for the oil to be detected are most preferably used as precursors for the base stock of the oil like pentanoic acid and heptanoic acid. Oil unspecific substances such as formaldehyde, acetaldehyde, formic acid and acetic acid are complementary indicators of an oil leakage.

At least one of the plurality of detectors 20 can be connected to each of the plurality of bleed ducts 18 connecting the bleed sources 12 to the at least one air conditioning pack 16, and/or at least one of the plurality of detectors 20 can be connected to the at least one air conditioning pack 16.

The method can further comprise the steps of: detecting substances specific for the oil, wherein at least one of the plurality of detectors is connected to each of the plurality of bleed ducts connecting the bleed sources to the at least one air conditioning pack, and/or detecting substances specific for the oil, wherein at least one of the plurality of detectors is connected to the at least one air conditioning pack.

The method can further comprise the steps of: mixing cooled bleed air from the at least one air conditioning pack with air from a cabin and/or cockpit in a mixer unit, and detecting substances specific for the oil, wherein at least one of the plurality of detectors is connected to each of the plurality of mixer ducts connecting the mixer unit to the at least one air conditioning pack.

Advantages of the System and Method of the Invention

According to the present invention, the air supply system of a vehicle such as an aircraft using engine- or APU-compressed air can be equipped with detectors or sensors or a set of detectors, which can detect substances or substance groups specifically released from oil that is used as lubricant in the engine or APU.

As the detectors are located in the air supply system, e.g., directly downstream of the bleed source instead of being located in the cabin or cockpit, they allow the precise location of an oil leakage. Accordingly, the bleed source, i.e., engine or APU from which the oil has leaked can be identified and appropriate counter-measures can be adapted.

More precisely, the detectors are located downstream of each of the bleed sources and thus each bleed source has its own detector. Once a detector detects a substance specific for an oil, such as pentanoic acid or heptanoic acid, one can derive that the corresponding bleed source leaks oil.

This has the advantage that, as opposed to a detector that would be located in the cabin or cockpit of the aircraft, the precise location of the oil leakage can be detected. In case the detector is located in the cabin or cockpit, one would be able to identify that there is an oil leak. As the oil leak is usually accompanied by a strong smell event, no essentially new information is provided by such a detector in the cabin or cockpit. By the provision of a detector for each of the bleed sources, the origin of the oil leakage can be precisely determined.

Oil leakages in the bleed system of engines and APUs can thus be detected by the detection of specific substances released from thermally degraded oil in the bleed air flow and hence indicate the origin of the contamination.

In order to narrow down the root cause of a potential pollution, each compressed air source is equipped with a separate detector or set of detectors in the respective supply duct.

The response of the detectors in the compressed air system can be used to identify the root cause of contamination either based on their individual response or in terms of a comparative analysis, i.e., compare the responses of different detectors, for example, in case external pollution triggers the sensor response. The response of the detectors can be used as a singular trigger for an informative message, serve as additional information in case a problem is assumed, or as information for aircraft maintenance.

DETAILED DESCRIPTION OF FIGURES

In the specific embodiment shown in FIG. 1, an air supply system for an aircraft comprising four engines is shown. Additionally, potential positions of detectors for substances or substance groups released from the thermally degraded lubricant oil are marked. Detectors connected to the trim air system in the pressurized area can differentiate between left and right-wing bleed air and hence between engines in case of aircraft with two engines only. Detectors in the pack as constituent assembly or directly after the pack are also adequate solutions.

Figure 2:
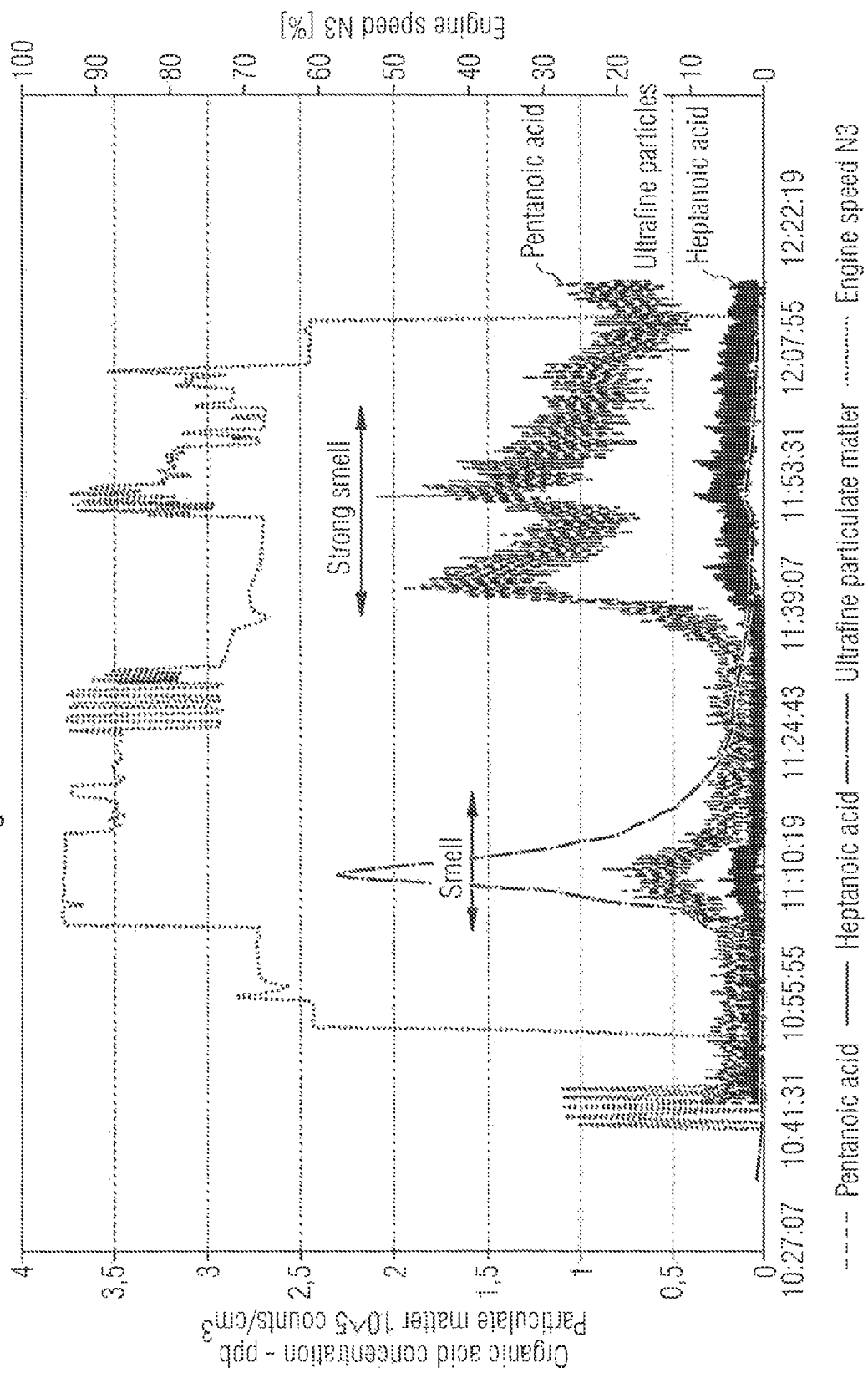
FIG. 2 shows the measurement of pentanoic acid and ultrafine particles taken in an aircraft cabin during a flight with provoked oil contamination in the engine compressor stage.

FIG. 2 shows the temporal correlation of measurements fine particulate matter and organic acid with the contamination event i.e., distribution of engine oil in the compressor section of one propulsion engine. The measurements were taken in the aircraft cabin during the entire flight. Organic acid indication correlated with the odor perception of all occupants in the cabin, both occurred during take-off and more strongly during descent. On the opposite particulate matter emission only occurred during take-off As a matter of fact, the oil specific substances causing a smell in the cabin are not only detected in the cabin during the actual contamination (take-off) but also later on owing to retention effects in the air supply system. For this reason, the monitoring of specific substances in the cabin is not the most appropriate solution; detectors are more preferably installed in the bleed system in order to get an accurate temporal correlation.

Figure 3:
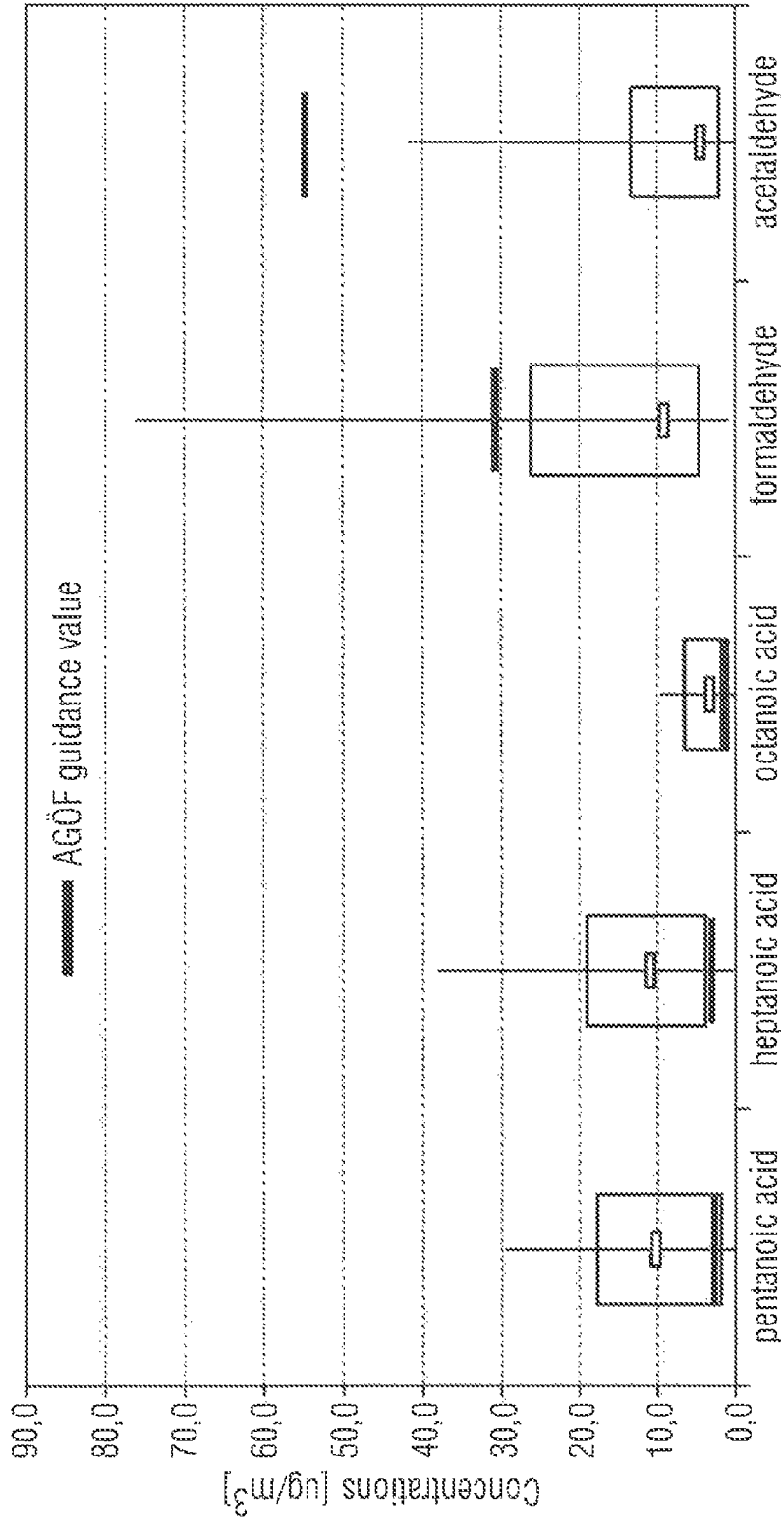
FIG. 3 shows substances present in particularly higher concentration in conjunction with an oil smell.

FIG. 3 shows a selection of substances which were found by traditional analytical methods in particular high concentrations during confirmed oil odors. Substances like C5 to C8 organic acids, pentanoic acid to octanoic acid rarely occur under normal conditions but were always detected during an oil odor event and their concentrations exceed typical levels found in indoor and environmental air. These substances are thus rather specific for oil pollution. On the other hand, formaldehyde and acetaldehyde are not only detected during every odor event but also under normal conditions or from other contamination sources. For this reason, they are not specific for an oil pollution. Nevertheless, their emission is greater during an odor event which represents a good complementary indication for an oil contamination.

Substances like acetaldehyde, formic acid and acetic acid might not be exclusively indicative of engine oil contamination but occur in elevated concentrations and can be thus used as complementary indicators. In this case a comparative approach between different bleed sources can be necessary to identify the relevance and origin of the contamination.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An air supply system comprising:
    at least two bleed sources configured to provide bleed air, wherein each bleed source comprises an engine or an auxiliary power unit, and an oil as lubricant for the engine or the auxiliary power unit;
    at least one air conditioning pack for cooling the bleed air from the bleed sources; and
    a plurality of bleed ducts, wherein each bleed duct connects one of the bleed sources to the at least one air conditioning pack,
    a plurality of first detectors, wherein each first detector is associated with only one of the at least two bleed sources and the plurality of first detectors are configured for detecting a substance specific for the oil, wherein the substance specific for the oil is a substance containing a carbonyl group or a substance containing a carboxyl group, and wherein the substance specific is a production of an oxidation reaction or a hydrolysis reaction of the oil, and,
    a second detector in the at least one air conditioning pack, the second detector configured for detecting a substance specific containing a carbonyl group or a substance containing a carboxyl group, and wherein the substance specific is a production of an oxidation reaction or a hydrolysis reaction of the oil.

2. The air supply system according to claim 1, wherein each of the plurality of first detectors is selected from an ion mobility spectrometer, a miniaturized mass spectrometer, and a laser based infrared spectrometer.

3. The air supply system according to claim 1, wherein the substance specific for the oil is selected from:
    a saturated or unsaturated, linear, or branched carboxylic acid with a carbon number from 1 to 10;
    a saturated or unsaturated, linear, or branched aldehyde with a carbon number from 1 to 10; and
    at least one of pentanoic acid, heptanoic acid, octanoic acid, and tiglic acid.

4. The air supply system according to claim 1, further comprising
    at least one of the plurality of first detectors is connected to each of the plurality of bleed ducts connecting the bleed sources to the at least one air conditioning pack.

5. The air supply system according to claim 1, further comprising
    a mixer unit connected to the at least one air conditioning pack, and
    a plurality of mixer ducts connecting the mixer unit to the at least one air conditioning pack, wherein
    the mixer unit mixes cooled bleed air from the at least one air conditioning pack with air from at least one of a cabin and a cockpit, and
    a plurality of third detectors, wherein at least one third detector is connected to each of the plurality of mixer ducts connecting the mixer unit to the at least one air conditioning pack.

6. The air supply system according to claim 1, comprising:
    three bleed sources comprising two engines and the auxiliary power unit;
    a synthetic oil as lubricant for the engines and the auxiliary power unit;
    the at least one air conditioning pack for cooling the bleed air from the bleed sources;
    the plurality of bleed ducts connecting the three bleed sources to the at least one air conditioning pack,
    a mixer unit connected to the at least one air conditioning pack,
    the plurality of mixer ducts connecting the mixer unit to the at least one air conditioning pack, and
    further comprising at least one of:
        at least one of the plurality of first detectors is connected to each of the plurality of bleed ducts connecting the bleed sources to the at least one air conditioning pack; or a plurality of third detectors, wherein at least third detector is connected to each of the plurality of mixer ducts connecting the mixer unit to the at least one air conditioning pack.

7. The air supply system according to claim 1, comprising five bleed sources comprising four engines and the auxiliary power unit;
a synthetic oil as lubricant for the engines and the auxiliary power unit;
the at least one air conditioning pack for cooling the bleed air from the bleed sources;
the plurality of bleed ducts connecting the five bleed sources to the at least one air conditioning pack,
a mixer unit connected to the at least one air conditioning pack,
the plurality of mixer ducts connecting the mixer unit to the at least one air conditioning pack, and
further comprising at least one of:
  at least one of the plurality of first detectors is connected to each of the plurality of bleed ducts connecting the bleed sources to the at least one air conditioning pack; or,
  a plurality of third detectors, wherein at least third detector is connected to each of the plurality of mixer ducts connecting the mixer unit to the at least one air conditioning pack.

8. A method for detecting oil leakage from bleed sources comprising the steps of:
  providing bleed air through at least two bleed sources, wherein each bleed source comprises an engine or an auxiliary power unit and an oil as lubricant for the engine or the auxiliary power unit,
  feeding the bleed air from the at least two bleed sources to at least one air conditioning pack through a plurality of bleed ducts,
  cooling the bleed air from the at least two bleed sources with at least one air conditioning pack,
  detecting substances specific for the oil with a plurality of first detectors and at least one second detector in the at least one air conditioning pack, wherein each of the plurality of first detectors is associated with only one of the at least two bleed sources, wherein each of the plurality of first detectors is configured for detecting a substance specific for the oil, wherein the substance specific for the oil is a substance containing a carbonyl group or a substance containing a carboxyl group, and wherein the substance specific is a production of an oxidation reaction or a hydrolysis reaction of the oil, wherein the second detector is configured for detecting a substance specific containing a carbonyl group or a substance containing a carboxyl group, and wherein the substance specific is a production of an oxidation reaction or a hydrolysis reaction of the oil and
  determining from which of the bleed sources an oil has leaked.

9. The method for detecting oil leakage from bleed sources according to claim 8, wherein each of the plurality of detectors is an ion mobility spectrometer or a miniaturized mass spectrometer.

10. The method for detecting oil leakage from bleed sources according to claim 8, wherein the substance specific for the oil is
  a saturated or unsaturated, linear or branched carboxylic acid with a carbon number from 1 to 10; or
  a saturated or unsaturated, linear or branched aldehyde with a carbon number from 1 to 10.

11. The method for detecting oil leakage from bleed sources according to claim 8, wherein the substance specific for the oil is pentanoic acid, heptanoic acid, octanoic acid or tiglic acid.

12. The method for detecting oil leakage from bleed sources according to claim 8, wherein the method further comprises:
  detecting substances specific for the oil, wherein at least one of the plurality of first detectors is connected to each of the plurality of bleed ducts connecting the bleed sources to the at least one air conditioning pack.

13. The method for detecting oil leakage from bleed sources according to claim 8, further comprising the steps of:
  mixing cooled bleed air from the at least one air conditioning pack with air from a cabin and/or cockpit in a mixer unit, and
  detecting substances specific for the oil with a plurality of third detectors, wherein at least one of the plurality of third detectors is connected to each of the plurality of mixer ducts connecting the mixer unit to the at least one air conditioning pack.

* * * * *